United States Patent [19]

Gupta et al.

[11] Patent Number: 4,558,017

[45] Date of Patent: Dec. 10, 1985

[54] LIGHT INDUCED PRODUCTION OF ULTRAFINE POWDERS COMPRISING METAL SILICIDE POWDER AND SILICON

[75] Inventors: Arunava Gupta, Madison; Gary A. West, Dover; James T. Yardley, Morristown, all of N.J.

[73] Assignee: Allied Corporation, Morris Township, Morris County, N.J.

[21] Appl. No.: 609,629

[22] Filed: May 14, 1984

[51] Int. Cl.$^4$ .................. B01J 19/12; C01B 33/06; C04H 35/58
[52] U.S. Cl. .................................... 501/96; 204/164; 204/157.1 R; 423/344
[58] Field of Search ................ 204/157.1 R, 157.1 L, 204/164; 423/326, 341, 344; 501/96

[56] References Cited

U.S. PATENT DOCUMENTS

| 3,138,468 | 6/1964 | Matkovich et al. | 501/96 |
| 4,022,872 | 5/1977 | Carson et al. | 423/297 |
| 4,343,687 | 8/1982 | Ronn | 204/157.1 R |

FOREIGN PATENT DOCUMENTS

| 901784 | 7/1962 | United Kingdom | 501/96 |
| 1156466 | 6/1969 | United Kingdom | 501/96 |

OTHER PUBLICATIONS

Murarka, Refractory Silicides for VSLI Production, Academic Press, 1983, pp. 115–131.
Danforth et al., Synthesis of Ceramic Powders by Laser Driven Reactions, Industrial Liaison Program Report, No. 10-17-82, ILP Publications Office, MIT, Cambridge, MA.
Nancy Stauffer, the Industrial Liaison Program of the Massachusetts Institute of Technology, Jul./Aug. 1984, vol. XII, No. 7, "Reports on Research", pp. 1 and 2.

Primary Examiner—Howard S. Williams
Attorney, Agent, or Firm—Gus T. Hampilos; Gerhard H. Fuchs

[57] ABSTRACT

A method of producing ultrafine powders comprising metal silicide powder and the products produced by the method are disclosed. The ultrafine powders comprising metal silicide powders are ideally suited to form stable colloidal suspensions which are used in the production of conductive metal silicide containing films. The process employs gaseous reactants comprising a metal halide and a silicon-containing compound. The reactants are exposed to high intensity light to produce ultrafine powders. In addition to the production of metal silicide powders, the ultrafine powders may also include silicon powder and metal subhalide powder. The ultrafine powders are particularly suited for use in VLSI and VVLSI production.

10 Claims, 5 Drawing Figures

LIGHT INDUCED PRODUCTION OF ULTRAFINE POWDERS COMPRISING METAL SILICIDE POWDER AND SILICON

This application is related to application Ser. No. 609,268, filed concurrently herewith, entitled "Production of Conductive Metal Silicide Films from Ultrafine Powders", and application Ser. No. 609,627, filed concurrently herewith, entitled "Light Induced Chemical Vapor Deposition of Conductive Titanium Silicide Films".

FIELD OF THE INVENTION

This invention relates to the productions of ultrafine powders comprising metal silicide. More particularly, it relates to the production of ultrafine powders comprising metal silicide powders from gas phase reactants which are exposed to high intensity light. The powders produced by the process may also include free silicon and metal subhalide. The powders are particularly suited for the production of conductive thin films for VLSI and VVLSI applications.

BACKGROUND OF THE INVENTION

The evolution of the electronics industry in recent years has resulted in a steady decrease of integrated circuit feature sizes. With the introduction of the 256K chip and research on the 512K chip in progress, feature sizes are shrinking to such a degree that many of the traditional semiconductor processing techniques are no longer adequate. Until recently, doped polysilicon has been used extensively as a conductor for gates and gate interconnects on metal-oxide semiconductor (MOS) devices. Doped polysilicon was chosen because it can withstand subsequent high temperature processing steps and because it has electrical properties, such as a bulk resistivity of about 1,000 $\mu\Omega$-cm, which are desirable. As conductor line widths are reduced to below $2\mu$, however, the resistance of polysilicon conductive lines is large enough to degrade the high speed performance of devices. Thus, with minimum feature sizes of $1\mu$ or less, the electronics industry has looked to refractory metal silicides as a solution to gate and gate interconnect problems in high density chip production.

Refractory metal silicides are now being used in place of polysilicon or in addition to polysilicon (as a two layer polysilicon-silicide conductor sometimes referred to as a polycide). Refractory metal silicides have very low bulk resistivities ( approx. 15–100 $\mu\Omega$-cm), can withstand temperatures in excess of 1,000° C. and, in general, do not oxidize easily. The silicides commonly associated with the formation of gate interconnects are titanium silicide ($TiSi_2$), tungsten silicide ($WSi_2$), molybdenum silicide ($MoSi_2$) and tantalum silicide ($TaSi_2$).

The term metal silicide as used herein is defined as a metallic compound having the general formula $M_xSi_y$ where M = a metal, $0 < x \leq 2$ and $0 < y \leq 1$.

Currently, a variety of methods are employed to produce conductive silicide coatings. They include sputtering or co-sputtering techniques, evaporation or co-evaporation processes, chemical vapor deposition processes requiring high substrate temperatures (pre- or post-deposition), and plasma induced chemical vapor deposition. For a detailed discussion of many of these methods see Murarka, *Refractory Silicides for VSLI Production*, Academic Press, 1983, pp. 115–31. All of these processes require high capital expeditures and considerable maintenance expenses in order to be effectively operated. In addition to the economic drawbacks, these processes are difficult to control and, therefore, the reproducability of chemically consistent products is a significant problem.

We have discovered a process for forming conductive films comprising metal silicides which is simple and easily monitored (in terms of coating thickness, step coverage, etc.), requires low capital expenditures and yields chemically consistent products. That process is disclosed in application Ser. No. 609,268, filed concurrently herewith, entitled "Production of Conductive Metal Silicide Films From Ultrafine Powders", the disclosure of which is hereby incorporated by reference.

Metal compound powders are ordinarily produced by grinding, ball milling or jet milling (e.g., fluid energy milling). These processes are capable of producing finely-divided powders with average particle sizes (diameters) of about 0.1 to 2.50 microns. However, it is not possible to obtain uniformly sized ultrafine particles by employing these processes.

Finely divided powders have been produced in recent years by more sophisticated techniques such as plasma gas heating. See, for example, U.S. Pat. No. 4,022,872. Such processes employ gas phase reactants which are brought together within a reactor and heated by hot plasma gas to the proper reaction temperature. The powders produced by such processes, typically, are at least 90% composed of powders ranging in size between 0.05 and 1.0 micron.

Ultrafine powders are defined as powders having an axial dimension (i.e., a dimension taken along any axis passing through a particle of the powder) of less than about 2000 Å. Such powders have recently been produced by laser induced gas phase reactions. See, for example, Danforth et al., "Synthesis of Ceramic Powders by Laser Driven Reactions" *Industrial Liaison Program Report* No. Oct. 17, 1982, ILP Publications Office, M.I.T., Cambridge, MA. In fact, powders produced by this process are generally less than 500 Å in diameter and spherical.

We have discovered that certain gas phase reactants can be exposed to high intensity light to produce ultrafine powder comprising metal silicide and free silicon. This ultrafine powder is particularly suited for use in our film making process because the powders form stable suspensions and because the powder composition produces a highly conductive strongly adherent layer after firing.

SUMMARY OF THE INVENTION

The invention includes a novel process for the production of a novel composition. The process comprises the steps of:

(a) supplying gas phase reactants to a reaction site, the gas phase reactants comprising a metal halide and a silicon-containing compound; and (b) exposing the gases at the reaction site to high intensity light to produce ultrafine powder comprising metal silicide and free silicon.

The ultrafine powder produced by the process comprises at least about 50 weight percent metal silicide and at least about 5 weight percent free silicon.

DETAILED DESCRIPTION OF THE INVENTION

Figure 1:
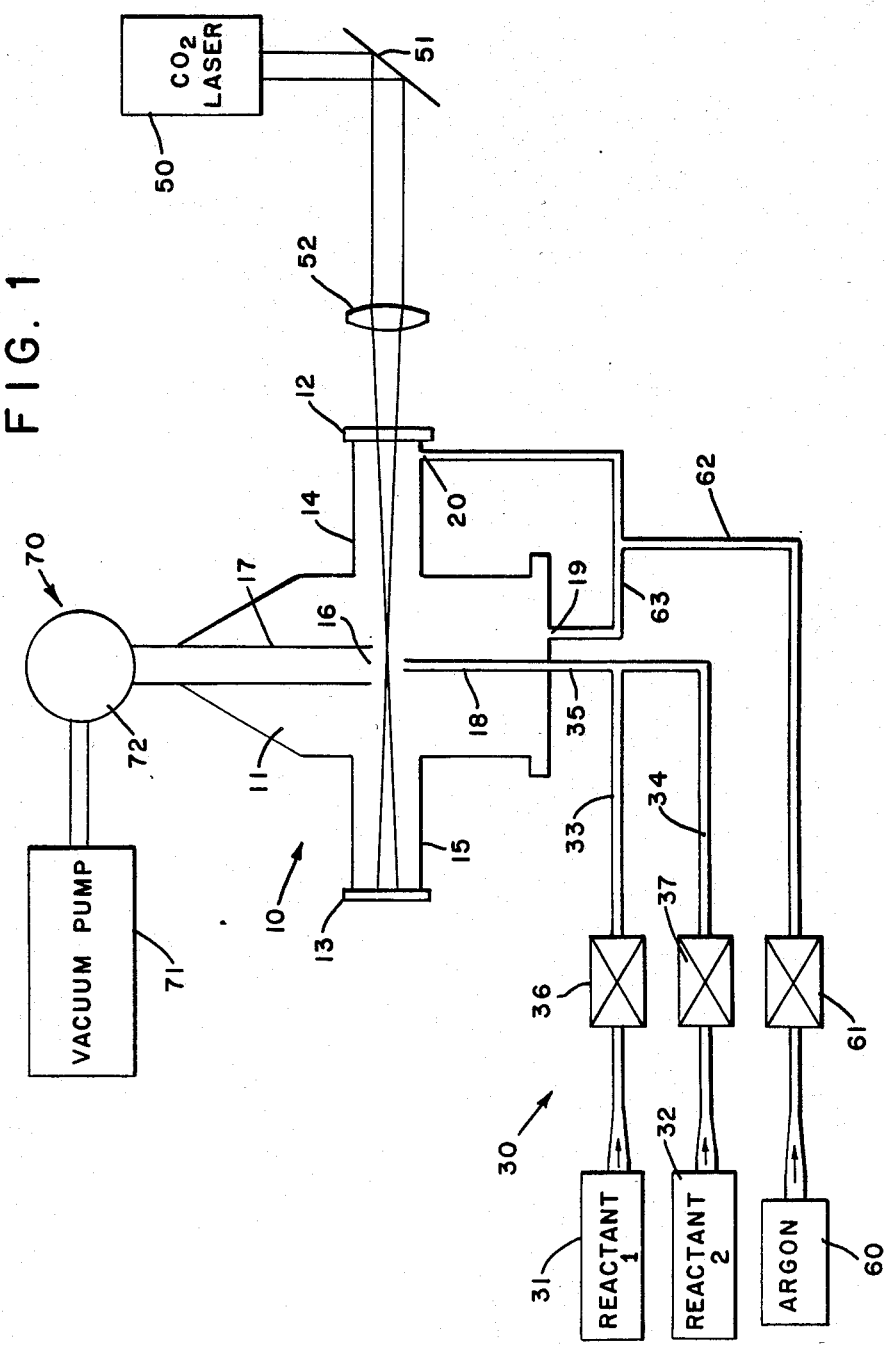
FIG. 1 is a schematic representation of the apparatus for producing the novel ultrafine powders by our inventive process.

The novel process comprises the steps of supplying gas phase reactants to a reaction site and exposing the gas phase reactants to high intensity light to produce ultrafine powder comprising metal silicide and free silicon. The apparatus depicted schematically in FIG. 1 is used to produce the novel powder composition by our inventive process. The apparatus comprises a reactor 10, a gaseous reactant delivery system 30, a high intensity light source 50 and a reaction chamber evacuation system 70.

The reactor 10 consists of a stainless steel reactor chamber 11 with four flanged arms. A beam transparent window 12 (e.g., sodium chloride) and a water cooled beam stop 13 (e.g., anodized copper) are fixed to one collinear set of arms 14 and 15, respectively, to accommodate a high intensity beam of light. A second set of arms (oriented 90° to the first set; not shown) are usually fitted with viewing windows (e.g., Plexiglas ®) to observe the powder reaction zone 16. An evacuation port 17, arranged opposite a reactant supply port 18, removes powders from the reaction zone and aids in controlling chamber pressure. The reactant supply port 18 is positioned to feed gaseous phase reactants into the high intensity light beam. The reaction chamber also includes a carrier gas port 19 for carrying the powders from the reaction zone to the evacuation port 17. In addition, the reactor includes a purging gas port 20 for ensuring that no reactants deposit on the window.

Reactant gases are admitted at the bottom of the reactor through the reactant supply port 18. Reactants are supplied from separate sources 31 and 32 through the respective supply lines 33 and 34 to a mixing line 35 which is connected to the reactant supply port 18. Control of the flow ratio of the reactants (which determines the composition of the powder and the powder size) is accomplished by electronic mass flow control units 36 and 37. For reactants which are liquid at room temperature, bubblers (not shown) may be placed in the supply lines 33 and 34 and an inert gas (or hydrogen) is used as a carrier. In addition, heaters (not shown) may be employed after the bubbler to maintain the supply lines above the liquid condensation point. When a bubbler is employed, the temperature of the bubbler must be separately controlled to provide the desired vapor pressure of the liquid reactant.

The source of high intensity light 50 is preferably a laser. The laser can produce either a continuous beam, such as is produced by a $CO_2$ laser, or a pulse beam, such as is produced by an excimer laser. In the embodiment depicted in the drawing, the beam emanates from a $CO_2$ laser and is directed through the reaction chamber 11 by a molybdenum mirror 51. The beam is focused with a 10 inch focal length sodium chloride lens 52. The focal point is centered over the reactant supply port and located about 2 mm from the reactant supply port exit (approx. 0.6 mm in diameter). The 10 inch focal length lens produces (assuming Gaussian optics) a 0.5 mm beam waist (diameter) over a distance of about 9 mm.

An inert gas purge 60, with a separate flow controller 61, communicates with the reactor 10 via purging gas supply line 62 and the purging gas port 20 to prevent powder deposition on the window 12. The inert gas purge includes a second connection 63 communicating with carrier gas port 19, near the bottom of the reactor and adjacent the supply nozzle 18, to supply inert gas to the reactor at a sufficient flow rate to carry the powdered product out of the reactor chamber 11.

The evacuation system 70 comprises the evacuation port 17 (a quartz "chimney" of 1 cm inside diameter) which is connected to a mechanical pump 71. Positioned at the top of the reactor is a filter 72 (e.g., AAQ grade by Balstron, Inc.). The exhaust of the vacuum pump is discharged through a container (not shown; e.g., containing alkaline water) in order to convert any unreacted gas to harmless compounds.

Prior to feeding the reactants to the chamber, the chamber is initially evacuated to remove unwanted contaminants (e.g., $O_2$, $H_2O$). It should be understood that any one of a variety of evacuation systems can be employed which are capable of reducing the chamber pressure to about a few millitorr. For example, in the preferred apparatus, a Sargent-Welch Model 1402 mechanical rough pump (pumping speed = 160 1/min) is used. Normally, after the initial evacuation, the reactor chamber and pump are purged for about 1 hr. with argon gas before admitting the reactants and laser beam. The purge flow is, in the preferred embodiment, set at about 217.5 standard cc/min. (SCCM).

The reactant gases are supplied to the reactor chamber by any delivery system capable of controlling the flow rates of the reactants. Gaseous reactant flow rates are usually in the range of about 2 to about 10 SCCM. In a commercial setting, flow rates on the order of 1000 SCCM are contemplated. The reactants are supplied by direct vaporization (i.e., heating; but to a temperature less than the temperature at which the gas phase reactants will react in the absence of high intensity light) or by providing a carrier gas to supply the reactants to the chamber. In a preferred embodiment of the invention, the silicon containing compound (a gas at room temperature) is directly supplied to the chamber and a metallic compound such as a metal halide (a liquid at room temperature) is carried to the reaction chamber by a gas carrier. When a gas carrier is used, it is preferred that it not react with the reactants. The preferred carrier gases include inert gases and hydrogen.

In accordance with the present invention, the metallic element is introduced into the reaction chamber as a metal halide, metal carbonyl or metal oxyhalide. The metallic elements of the metallic compounds which are contemplated include metals from Groups IIIb–VIb and the ferro metals of Group VIII of the Periodic Chart of the Elements. More specifically they include titanium, zirconium, hafnium, vanadium, niobium, tantalum, chromium, molybdenum, tungsten, iron, cobalt, nickel, palladium and platinum. The preferred metals include titanium, tantalum, molybdenum and tungsten. Among the metallic compounds, metal halides are preferred. The metal halides can include metal chlorides, metal fluorides, metal bromides and metal iodides. In addition to halides of principal valence of the aforementioned metals, subhalides, e.g., subchlorides or subfluorides could also be used. Further, mixtures of halides or halides and subhalides may also be used. Of the possible metal halides, metal chlorides and metal fluorides are preferred. The most preferred metal halides are metal chlorides. Examples of metal chlorides include titanium tetrachloride, zirconium tetrachloride, hafnium tetrachloride, tantalum pentachloride, vanadium pentachloride, niobium pentachloride, molybdenum chloride, tungsten hexafluoride, chromium chloride, ferric chloride and cobalt chloride.

The source of silicon is introduced into the reaction chamber as a gaseous silicon containing compound. The preferred class of compounds are hydrosilicides (silanes) e.g., $Si_xH_{2x+2}$. Other potential sources of silicon include silicon tetrahalides e.g., silicon tetrachloride and halogenated hydrosilicides, e.g., $SiH_3Cl$, $SiH_2Cl_2$ and $SiHCl_3$. The preferred gas is $SiH_4$.

At least one of the gas of the metal halide and the gas of the silicon containing compound should be capable of absorbing the high intensity light produced by the source. In the event, however, that the reactants do not absorb the high intensity light, and additional chemically inert absorbing gas should be supplied in order to induce the reaction. Such absorbing gases can include Genetron®-11, Genetron®-12, Genetron®-113, Genetron®-114, $SiF_4$, $SF_6$, vinylchloride, perchloroethylene and trichloroethylene with $SF_6$ being preferred.

The flow ratio of the gases [standard cubic centimeter/min. (SCCM) of gas of metal halide per standard cubic centimeter/min. (SCCM) of gas of silicon containing compound] is variable depending on the desired composition of the powder. The ratio corresponds to an atomic flow ratio which produces a particular stoichiometry of the ultrafine metal silicide powders. Depending on the specific atomic flow ratio, the ultrafine powders can be characterized as metal compound-containing, stoichiometrically balanced or silicon-containing. The metal compound-containing or silicon-containing ultrafine powders (unbalanced stoichiometric compositions) comprise metal compound (e.g., $TiCl_3$ for an $SiH_4$—$TiCl_4$ reaction) and stoichiometric and/or nonstoichiometric metal silicide or stoichiometric and/or non-stoiciometric metal silicide and free silicon, respectively.

The reaction which produces the ultrafine powders comprising the metal silicide is induced by high intensity light. High intensity light is defined as light waves (ultraviolet, visible or infra red) of sufficient intensity to thermally induce or photolytically induce (or both) a reaction between gas phase reactants. Generally, a sufficient intensity of light would be at least about 10 watts/cm².

Any source may be used which is capable of producing high intensity light. Preferably, the high intensity light is produced by a laser. Any type of laser capable of producing high intensity light is suitable for use in the present invention; the $CO_2$ laser and the excimer laser are preferred. The laser may supply the light as a continuous beam or as individual pulses. In addition, the laser may be tuned (regulated to deliver a specific wavelength of light corresponding to a frequency absorbed by at least one of the gas phase reactants) or untuned (delivering a wavelength or set of wavelengths of light which are not regulated to necessarily correspond to a frequency absorbed by at least one of the gas phase reactants). For example, a tunable $CO_2$ laser can produce high intensity light with a frequency of 944.2 $cm^{-1}$ (this frequency corresponds to the P (20) emission line of the laser) which is strongly absorbed by $SiH_4$ reactant gas.

It is believed that the use of light produced by a $CO_2$ laser induces primarily a pyrolytic reaction. A pyrolytic reaction is a reaction which heats the vapor phase reactants by collision of non-absorbing reactives with absorbing reactives to a temperature at which the reactants decompose. When a $CO_2$ laser is employed, it is preferred that the intensity of light produced by the laser be at least about 100 watts/cm².

The reaction induced by an excimer laser is believed to be primarily a photolytic reaction. A photolytic reaction causes dissociation of at least one vapor phase reactant into free radicals which in turn react with the remaining reactant. When an excimer laser is employed, it is preferred that the laser produce at least about 10 pulses of light per second with each pulse lasting at least about 15 nanoseconds to yield an intensity on the order of megawatts/cm².

The production of ultrafine powders is also dependent on the reaction chamber pressure. The reaction chamber pressure is dependent on the reactant gas pressures, purging gas pressures and the control of the evacuation system. The gas pressures are controlled by the reactant temperatures and the electronic mass by the reactant temperatures and the electronic mass flow control units. The evacuation system is normally controlled by a needle valve provided in the exit port. The reaction chamber is maintained above about 100 torr for inducing homogeneous powder nucleation, with the range of between about 200 and about 500 torr being preferred.

The size of the ultrafine powders is controlled by specific process parameters. The final particle size is mainly dependent on the partial pressure of the gas phase reactants. Generally, an increase in total cell pressure causes the particle sizes to increase. Final particle size is also dependent on the intensity of the light; the higher the intensity, the smaller the particle size. Additionally, reactant gas velocity results in changes in reaction temperature and, consequently, the final particle size increases with decreasing gas velocities. Finally, the particle size (growth) also depends on the depletion of reactant gases. Dilution of the absorbing reactant gas will reduce the reaction zone temperature and the available reactant gas which in turn results in decrease particle size. Ordinarily, powders produced by our process are less than about 500 Å in diameter which aids in producing stable colloidal suspensions and, consequently, very thin films.

As stated theretofor, the gaseous reactant flow rates are varied to produce the desired powder composition. Flow ratios less than about 1:2 to 1:4 (metal halide to silicon-containing compound) and will produce ultrafine powders comprising metal silicide and free silicon. The presence of free silicon in the powders is particularly advantageous. The silicon functions as a sintering aid in the production of thin films without substantially affecting the resistivity of the film products. The silicon produces a more dense product, a more adherent film and aids in reducing process times and temperatures.

Figure 2A:
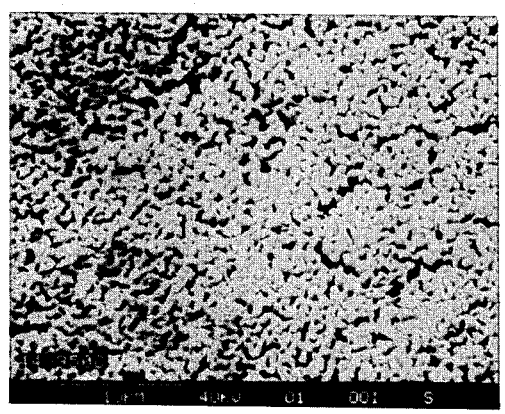
FIGS. 2a and 2b are scanning electron micrographs of a titanium silicide film produced from the novel powders of the present invention.

Silicon is advantageous to the process of using the powders when present in the range of between about 5 and about 50 weight percent. Within that range, the presence of silicon in the range of about 35 to about 45 weight percent will produce a continuous essentially non-porous film product as can be seen by comparison of FIGS. 2a and 2b (produced from powders consisting of 62.5 weight percent TiSi$_2$, 28.4 weight percent Si and 9.1 weight percent TiCl$_2$) with FIGS. 3a and 3b (produced from powders consisting of 54.2 weight percent TiSi$_2$, 40 weight percent Si and 5.8 weight percent TiCl$_3$).

In a preferred embodiment, ultrafine powders comprising titanium silicide (crystalline) powder are prepared in accordance with our process using the apparatus discussed above. The overall chemical reactions which are believed to occur during powder formation are:

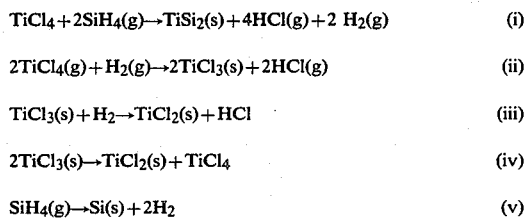

$$TiCl_4 + 2SiH_4(g) \rightarrow TiSi_2(s) + 4HCl(g) + 2H_2(g) \quad (i)$$

$$2TiCl_4(g) + H_2(g) \rightarrow 2TiCl_3(s) + 2HCl(g) \quad (ii)$$

$$TiCl_3(s) + H_2 \rightarrow TiCl_2(s) + HCl \quad (iii)$$

$$2TiCl_3(s) \rightarrow TiCl_2(s) + TiCl_4 \quad (iv)$$

$$SiH_4(g) \rightarrow Si(s) + 2H_2 \quad (v)$$

By controlling the flow ratios of TiCl$_4$ and SiH$_4$, the composition of the powders can be controlled. Reactions (i) and (v) are the reactions which produce our novel composition. Reactions (ii)–(iv) are generally believed to be undesirable side reactions; however, the inclusion of metal subhalides such as TiCl$_3$ and TiCl$_2$ in amounts less than about 20 weight percent has not proved detrimental in the formation of conductive thin films. The following examples describe processes for producing the powders and present results obtained in using the powders to produce conductive layers.

EXAMPLE 1

Reactant gases comprising silane (SiH$_4$) and TiCl$_4$ were used to produce ultrafine powders comprising TiSi$_2$. The flow rate of SiH$_4$ into the reaction chamber was 10.0 SCCM. The flow of argon to carry TiCl$_4$ vapor into the chamber was 11.2 SCCM. Argon was used to purge the windows and carry the powder to the filter. The argon was supplied at a rate of 217.5 SCCM. The temperature of the TiCl$_4$ bubbler was 90° C. This temperature produced a TiCl$_4$ vapor pressure at 90° C. of 196 torr. The total reactor pressure was 475–480 torr during powder production. The laser power was 180 watts and the beam was focused using a 25.4 cm NaCl lens. The process was run for 150 min. and produced 2.2 grams of powder. The powder composition was 82.5 weight percent TiSi$_2$ and 17.5 weight percent TiCl$_3$(+TiCl$_2$).

EXAMPLE 2

The parameters of the system as described in Example 1 were maintained constant except for the temperature of the TiCl$_4$ bubbler which was changed to 84° C. At this temperature, the vapor pressure of TiCl$_4$ is 157 torr. This total reactor pressure was 460–470 torr. After 150 min., 2.1 grams of powder were produced. The powder contained 63.2 weight percent TiSi$_2$, 30 weight percent free silicon and 6.8 weight percent TiCl$_3$(+TiCl$_2$).

EXAMPLE 3

A number of samples of ultrafine powders comprising TiSi$_2$, Si and TiCl$_3$(+TiCl$_2$) were obtained using two variations of the basic processes (See Table 1). Samples 33–37 and 42–45 were produced by bubbling a carrier gas through the TiCl$_4$ reactant. Samples 38–41 were produced by passing the carrier gas over the TiCl$_4$ reactant. In all cases of each variation, the only parameter which was varied from run to run was the TiCl$_4$ reactant temperature. Varying the TiCl$_4$ reactant temperature changed the TiCl$_4$ vapor pressure which in turn modified the final composition of the powder. All samples were produced using a laser power of 175–185 watts. The beam was focused by using a 25.4 cm NaCl lens. The beam waist was about 0.6 mm in diameter.

TABLE 1

| Sample No. | TiCl$_4$ Reservoir Configuration* | TiCl$_4$ Reservoir Temperature (°C.) | Carrier gas/flow rate (SCCM) | SiH$_4$ flow rate (SCCM) | Argon purge flow rate (SCCM) |
|---|---|---|---|---|---|
| 33 | a | 86 ± 2 | Ar/11.8 | 10.0 | 217.5 |
| 34 | a | 89 ± 2 | Ar/11.8 | 10.0 | 217.5 |
| 35 | a | 91 ± 2 | Ar/11.8 | 10.0 | 217.5 |
| 36 | a | 93 ± 2 | Ar/11.8 | 10.0 | 217.5 |
| 37 | a | 83 ± 1 | Ar/30.5 | 10.0 | 217.5 |
| 38 | b | 78 ± 1 | Ar/30.5 | 10.0 | 217.5 |
| 39 | b | 80 ± 1 | Ar/30.5 | 10.0 | 217.5 |
| 40 | b | 90 ± 1 | Ar/30.5 | 10.0 | 217.5 |
| 41 | b | 95 ± 1 | Ar/30.5 | 10.0 | 217.5 |
| 42 | a | 85 ± 1 | Ar/11.8 | 10.0 | 217.5 |
| 43 | a | 83 ± 1 | Ar/11.8 | 10.0 | 217.5 |
| 44 | a | 79 ± 1 | Ar/11.8 | 10.0 | 217.5 |
| 45 | a | 79 ± 1 | H$_2$/11.8 | 10.0 | 217.5 |

| Sample No. | Reaction Chamber Pressure (torr) | Amount of Product (g) | Elapsed Time (hours) | Impurities wt % free Si | Impurities wt % TiCl$_2$ or TiCl$_3$ |
|---|---|---|---|---|---|
| 33 | 440–470 | 1.7 | 2.4 | 7.5 | 15.1 |
| 34 | 418–453 | 2.0 | 2.5 | 15.3 | 10.3 |
| 35 | 433–448 | 1.7 | 2.5 | 17.1 | 7.4 |
| 36 | 434–441 | 2.2 | 2.5 | 0.6 | 20.5 |
| 37 | 430–440 | 2.3 | 2.5 | 2.1 | 12.6 |
| 38 | 430–438 | 0.7 | 1.5 | 36.0 | 6.9 |
| 39 | 426–437 | 2.2 | 2.7 | 61.0 | 6.3 |
| 40 | 432–437 | 2.1 | 2.7 | 51.0 | 6.1 |
| 41 | 432–442 | 2.0 | 2.7 | 40.0 | 5.8 |
| 42 | 420–434 | 2.0 | 2.5 | 15.4 | 15.9 |
| 43 | 433–435 | 2.2 | 2.5 | 17.3 | 10.4 |
| 44 | 416–434 | 1.6 | 1.8 | 28.4 | 9.1 |
| 45 | 420–438 | 2.1 | 2.8 | 10.3 | 32.6 |

(*a) carrier gas bubbled thru liquid TiCl$_4$;
(b) carrier gas flows over surface of liquid TiCl$_4$;
resulting powder products have higher amounts of free Si and lower amounts of TiCl$_2$ or TiCl$_3$
Argon purge provides sufficient gas flow to carry powder product out of the reactor and also prevents powder deposition on the reactor windows.

EXAMPLE 4

Tungsten silicide-containing powders were produced from tungsten hexaflouride and silane (SiH$_4$) by a CO$_2$ laser induced reaction process. The general reaction is:

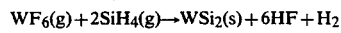

$$WF_6(g) + 2SiH_4(g) \rightarrow WSi_2(s) + 6HF + H_2$$

The flow rate of silane (SiH$_4$) was 10.0 SCCM and the flow rate of tungsten hexaflouride was 5.0 SCCM. Both reactants were directly supplied as gases into the reaction chamber. Argon was urged to purge the window and carry the powder to the filter. The argon flow rate was 217.5 SCCM. The total reaction chamber pressure was 240–250 torr. The laser power was 50 watts and the beam was focused using a 25.4 cm NaCl lens. Unlike the process of formation of TiSi$_2$, the reactant gases are flown into the reaction chamber separately in order to reduce surface catalyzed reactions due to the highly reactive nature of WF$_6$. X-ray diffractions of the powder indicated the presence of $WSi_2$ mixed with free silicon and tungsten. The flow rates were intended to produce a pure $WS_2$ powder and it is believed that incomplete mixing of the reactants before the reaction initiated was the cause of the presence of free Si and W.

EXAMPLE 5

Figure 2B:
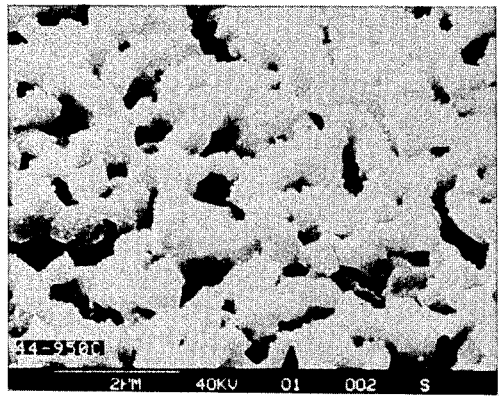

8 mg of ultrafine powder conprising titanium silicide powder containing 28.4 weight percent excess silicon (and 9.1 weight percent $TiCl_3$) was mixed with 0.5 cc of ethanol and sonicated. The suspension was sprayed onto a polysilicon coated silicon wafer with sheet resistance of 16 $\Omega$/square. The sprayed wafer was heated in vacuum at 950° C. for 30 min. The sheet resistance after sintering was measured to be 0.25 $\Omega$/square and the film thickness was about 30,000 Å (resistivity of the film 80 $\mu\Omega$-cm). Scanning electron micrograph views of the film after firing are shown in FIGS. 2 and 2b. Although the film exhibits both isolated and interconnected pores ($-1$ micron), the film has a low resistivity.

EXAMPLE 6

Figure 3A:
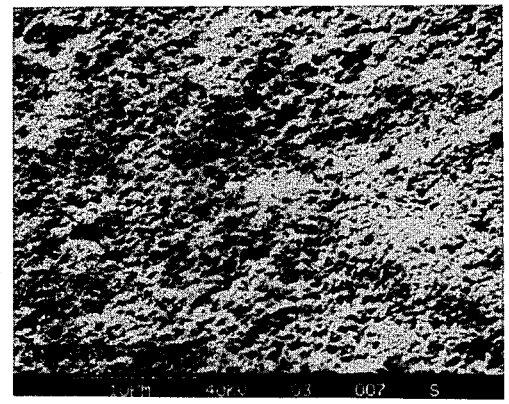
FIGS. 3a and 3b are scanning electron micrographs of a titanium silicide film produced from a novel powder composition including a higher silicon content than was employed in the FIG. 2 process.
Figure 3B:
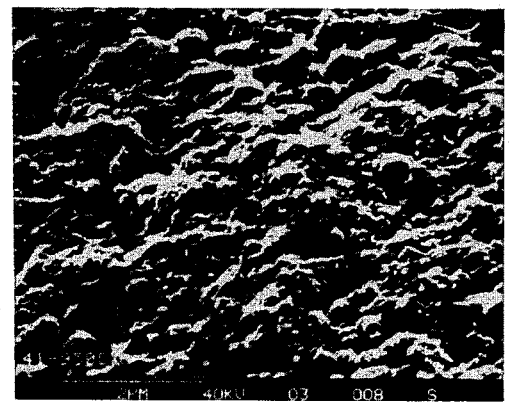

8 mg of ultrafine powder comprising titanium silicide powder containing 40.0 weight percent excess silicon (and 5.8 weight percent $TiCl_3$) was mixed with 0.5 of ethanol and sonicated. The suspension was sprayed onto a polysilicon coated silicon wafer with sheet resistance of 16 $\Omega$/square. The sprayed wafer was heated in vacuum at 950° C. for 30 min. The sheet resistance after sintering was measured to be 0.6 $\Omega$/square and the film thickness was about 50,000 Å (resistivity of the film $\simeq$300 $\mu\Omega$-cm). Scanning electron micrograph views of the film after firing are shown in FIGS. 3a and 3b. Unlike the film in Example 5, this film has very little porosity. The higher silicon content of the starting powder assists in the densification process. The film, however, has somewhat higher resistivity due to the higher silicon content.

We claim:

1. A mixture of powders, said mixture comprising at least about 50 weight percent metal silicide and at least about 5 weight percent free silicon.

2. A mixture as in claim 1 comprising between about 5 and about 50 weight percent of free silicon.

3. A mixture as in claim 2 wherein the free silicon is present in an amount between about 35 and about 45 weight percent.

4. A mixture as in claim 1 further comprising metal subhalide.

5. A mixture as in claim 4 wherein the metal subhalide is not more than about 20 weight percent.

6. A mixture as in claim 1 wherein the mixture comprises ultrafine powder, said ultrafine powder consisting of powder particles which are generally spherical and have diameters of not more than about 500 Å.

7. A mixture as in claim 1 wherein the metal silicide is a stoiciometrically unbalanced composition.

8. A mixture as in claim 1 wherein the metal silicide is crystalline.

9. A mixture as in claim 1 wherein the metal is selected from the group consisting of Groups IIIb-VIb and the ferro metals of Group VIII of the Periodic Chart of the Elements.

10. A product produced by the process comprising the steps of:
   (a) supplying gas phase reactants to a reaction site, the gas phase reactants comprising a metal halide and a silicon-containing compound, at a ratio of less than about 1:2 to about 1:4, including regulating the supply of reactants to produce a total reaction chamber pressure of at least about 200 torr; and
   (b) exposing the gases at the reaction site to high intensity light of at least about 10 watts/cm$^2$ to produce ultrafine powder comprising metal silicide and free silicon.

* * * * *